US012686339B2

(12) United States Patent
Jeon et al.

(10) Patent No.: US 12,686,339 B2
(45) Date of Patent: Jul. 21, 2026

(54) VECHICLE STORAGE COMPARTMENT ALONG A TOP SURFACE OF A DOOR INTERIOR PANEL

(71) Applicant: GM GLOBAL TECHNOLOGY OPERATIONS LLC, Detroit, MI (US)

(72) Inventors: Minseok Jeon, Gimpo-si (KR); Hyunsoo Lim, Bucheon-si (KR); Jinki Hwang, Incheon (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 300 days.

(21) Appl. No.: 18/587,891

(22) Filed: Feb. 26, 2024

(65) Prior Publication Data

US 2025/0269801 A1      Aug. 28, 2025

(51) Int. Cl.
B60R 7/04      (2006.01)
B60R 11/00      (2006.01)

(52) U.S. Cl.
CPC ....... B60R 7/046 (2013.01); B60R 2011/0021 (2013.01)

(58) Field of Classification Search
CPC ............ B60R 7/046; B60R 2011/0021; B60R 5/0413; B60R 1/0243; B60P 1/6427; B60P 1/6418
See application file for complete search history.

(56) References Cited

U.S. PATENT DOCUMENTS

| | | | | |
|---|---|---|---|---|
| 1,419,490 A * | 6/1922 | Carroll | .................... | B60R 7/046 |
| | | | | 224/543 |
| 6,062,631 A * | 5/2000 | Futschik | ............. | B60R 13/0243 |
| | | | | 296/146.7 |
| 12,202,428 B1 * | 1/2025 | Lopez Martinez | .... | B60J 5/0413 |
| 2001/0052715 A1 * | 12/2001 | McAndrew | ......... | B60R 11/0264 |
| | | | | 296/146.7 |
| 2006/0012205 A1 * | 1/2006 | Radu | ........................ | B60R 7/046 |
| | | | | 296/37.13 |
| 2006/0097536 A1 * | 5/2006 | DePue | ...................... | B60R 7/04 |
| | | | | 296/37.8 |
| 2015/0298616 A1 * | 10/2015 | Dassen | ................... | B60R 7/046 |
| | | | | 296/37.13 |
| 2016/0039348 A1 * | 2/2016 | Bowser | ................... | B60R 7/084 |
| | | | | 296/37.13 |
| 2017/0021779 A1 * | 1/2017 | Yoshida | .................... | B32B 3/30 |
| 2021/0197730 A1 * | 7/2021 | Shiono | ...................... | B60R 1/26 |
| 2022/0009324 A1 * | 1/2022 | Yamaguchi | ............. | B60J 5/0412 |
| 2023/0322169 A1 * | 10/2023 | Aumann | ............. | B60R 13/0243 |
| | | | | 296/1.08 |

(Continued)

FOREIGN PATENT DOCUMENTS

| | | | | |
|---|---|---|---|---|
| DE | 1717576 U | 2/1956 | | |
| DE | 2516778 A1 * | 10/1976 | ............. | B60R 7/046 |
| DE | 3406861 A1 | 9/1985 | | |

(Continued)

*Primary Examiner* — Gregory A Blankenship
(74) *Attorney, Agent, or Firm* — Ingrassia Fisher & Lorenz, LLP | IF&L

(57) ABSTRACT

Disclosed is a product that may include a vehicle door interior panel having lower portion having a front surface, opposite rear surface, bottom surface and a top surface, a storage compartment having a lid hinged to the at least one wall, wherein the lid forms a portion of the top surface of the bottom portion of the interior panel.

20 Claims, 6 Drawing Sheets

(56)          References Cited

U.S. PATENT DOCUMENTS

2025/0229720  A1 *   7/2025   Jo  ............................ B60R 7/046
2025/0269801  A1 *   8/2025   Jeon  ........................ B60R 7/046

FOREIGN PATENT DOCUMENTS

DE           10315653  A1      11/2004
DE        102013001496  A1       7/2014
DE        102014017797  B3  *    2/2016    ......... B60R 11/0217
FR           2961453  A3  *   12/2011    ............ B60R 11/02
FR           3077039  A1  *    7/2019    ......... B60R 13/0243
FR           3126365  A1  *    3/2023    ............ B60K 35/22
FR           3140592  A1  *    4/2024    .............. B60R 7/04
GB           2262875  A   *    7/1993    ................ B65F 1/02

* cited by examiner

VECHICLE STORAGE COMPARTMENT ALONG A TOP SURFACE OF A DOOR INTERIOR PANEL

INTRODUCTION

The technical field generally relates to vehicle storage compartments and components and method of using the same.

BACKGROUND

Cars traditionally have had storage compartments in the glove box, center console, and door pockets. However, these compartments are often small and inconveniently located. For example, the glove box is often difficult to reach while driving, and the center console can become cluttered with other items. Door pockets are also small and can be awkward to use, especially in the back seat. The front door upper trim is usually a nonfunctional decorative piece of plastic or other material. Storage space in your car is always important, especially in small cars where every cubic inch of space counts.

Accordingly, it is desirable to provide a product including a vehicle storage compartment, which in a number of variations may include non-traditional materials for a vehicle storage compartment and may be located in a non-traditional place in a vehicle. Furthermore, other desirable features and characteristics of the variations disclosed herein will become apparent from the subsequent detailed description and the appended claims, taken in conjunction with the accompanying drawings and the foregoing.

SUMMARY

A number of variations may include a product including a vehicle door interior panel having lower portion having a front surface, opposite rear surface, bottom surface and a top surface, a storage compartment having a lid hinged to the at least one wall, wherein the lid forms a portion of the top surface of the lower portion of the interior panel.

A number of variations may include a product wherein the at least one wall includes a bottom wall.

A number of variations may include a product wherein the at least one wall further includes at least one connecting wall extending from the bottom wall.

A number of variations may include a product wherein the at least one connecting wall includes a front wall and an opposite rear wall, and an outer side wall and an inner side wall each connected to the front wall and rear wall.

A number of variations may include a product wherein the lid is hinged to the at least one connecting wall.

A number of variations may include a product wherein the lid is hinged to the at least one connecting wall by a metal hinge or a flexible hinge comprising a polymeric material or fabric.

A number of variations may include a product further including a zipper having a first row of teeth connected to the lid and a second row of teeth connected to the at least one connecting wall, and a slide for drawing the first row of teeth and the second row of teeth together to close the storage compartment or to separate the first row of teeth and the second row of teeth to open the storage compartment and allow the lid to be moved to an open position.

A number of variations may include a product wherein the lid, bottom wall, and at least one connecting wall each includes an inflexible material.

A number of variations may include a product wherein the inflexible material includes a polymeric material, composite, or metal.

A number of variations may include a product further including a fabric, natural leather, synthetic leather, or polymeric material covering an outer surface of the lid.

A number of variations may include a product wherein the storage compartment is located along the top surface closer to the front surface than the rear surface of the interior panel.

A number of variations may include a product further including a vehicle having a dashboard and wherein the storage compartment is located along the top surface near the dashboard.

A number of variations may include a product wherein interior panel includes an interior face facing a driver seat or passenger seat, and wherein the interior face includes a portion curved toward the dashboard, and wherein at least a portion of the storage compartment is located behind the curved portion of the interior face of the interior panel.

A number of variations may include a product further including a vehicle having an A-pillar and wherein the storage compartment is located along the top surface on the door interion panel near the A-pillar.

A number of variations may include a product including a vehicle having a pair of spaced a part A-pillars and a dashboard extending therebetween; a vehicle door interior panel having lower portion having a front surface, opposite rear surface, bottom surface and a top surface, a storage compartment having a lid hinged to the at least one wall, wherein the lid forms a portion of the top surface of the bottom portion of the interior panel; wherein the storage compartment is located along the top surface of the interior panel closest to the dashboard and one of the spaced a part A-pillars.

A number of variations may include a product wherein the at least one wall includes a front wall and an opposite rear wall, and an outer side wall and an inner side wall each connected to the front wall and rear wall.

A number of variations may include a product wherein the lid is hinged to the at least one wall by a metal hinge or a flexible hinge including a polymeric material or fabric.

A number of variations may include a product further comprising a zipper having a first row of teeth connected to the lid and a second row of teeth connected to the at least one connecting wall, and a slide for drawing the first row of teeth and the second row of teeth together to close the storage compartment or to separate the first row of teeth and the second row of teeth to open the storage compartment and allow the lid to be moved to an open position.

A number of variations may include a product wherein interior panel includes an interior face facing a driver seat or passenger seat, and wherein the interior face includes a portion curved toward the dashboard, and wherein at least a portion of the storage compartment is located behind the covered portion of the interior face of the interior panel.

A number of variations may include a method including assembling a vehicle door interior panel having lower portion having a front surface, opposite rear surface, bottom surface and a top surface, a storage compartment having a lid hinged to the at least one wall, wherein the lid forms a portion of the top surface of the bottom portion of the interior panel.

BRIEF DESCRIPTION OF THE DRAWINGS

The variations will hereinafter be described in conjunction with the following drawing figures, wherein like numerals denote like elements, and wherein.

DETAILED DESCRIPTION

The following detailed description is merely illustrative in nature and is not intended to limit the application and uses. Furthermore, there is no intention to be bound by any expressed or implied theory presented in the preceding technical field, background, brief summary or the following detailed description.

Figure 1:
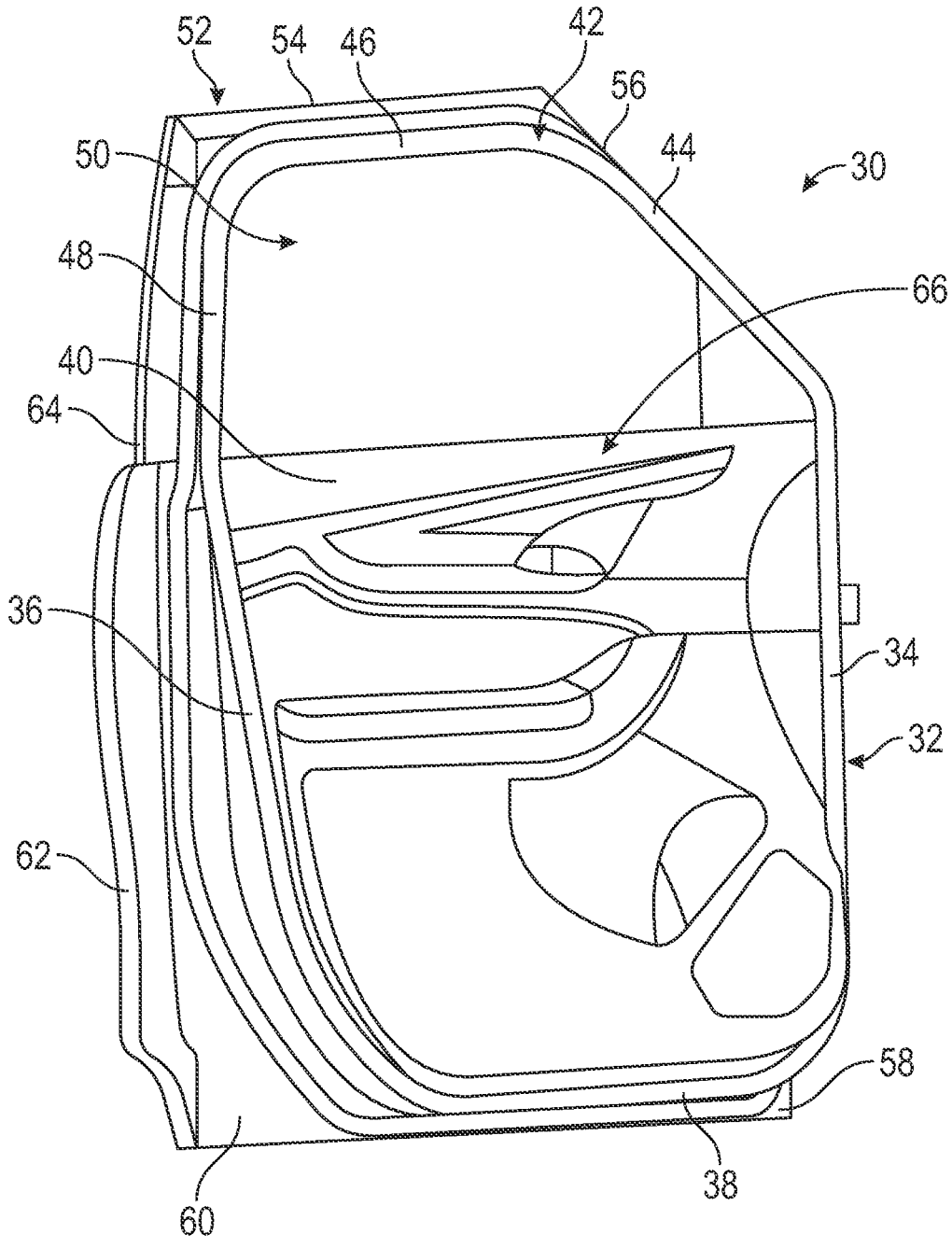
FIG. 1 illustrates a vehicle door including a door frame, and a door interior panel according to a number of variations.

A number of variations are illustrated in FIG. 1, which may include a product which may be a vehicle door interior panel 30 having a lower portion 32 and an upper portion 42. The lower portion 32 may include a forward surface 34, a rear surface 36, a bottom surface 38, and a top surface 40. The upper portion 42 may include an A-pillar engagement portion 44, a top portion 46, a B pillar engagement portion 4, which along with the top surface 40 of the lower portion 32 define a window opening 50. The vehicle door interior panel 30 may be mounted to a door frame 52 typically made of stamped metal. The door frame 52 may include a roof engaging edge 54, an A-pillar engaging edge 56, a front edge 58, a bottom edge 60, a rear edge 62, and a B-pillar engaging edge 64. The lower portion 32 of the vehicle door interior panel 30 may be configured to accommodate a storage compartment area 66 near the upper front portion of the lower portion 32 of the vehicle door interior panel 30.

Figure 2:
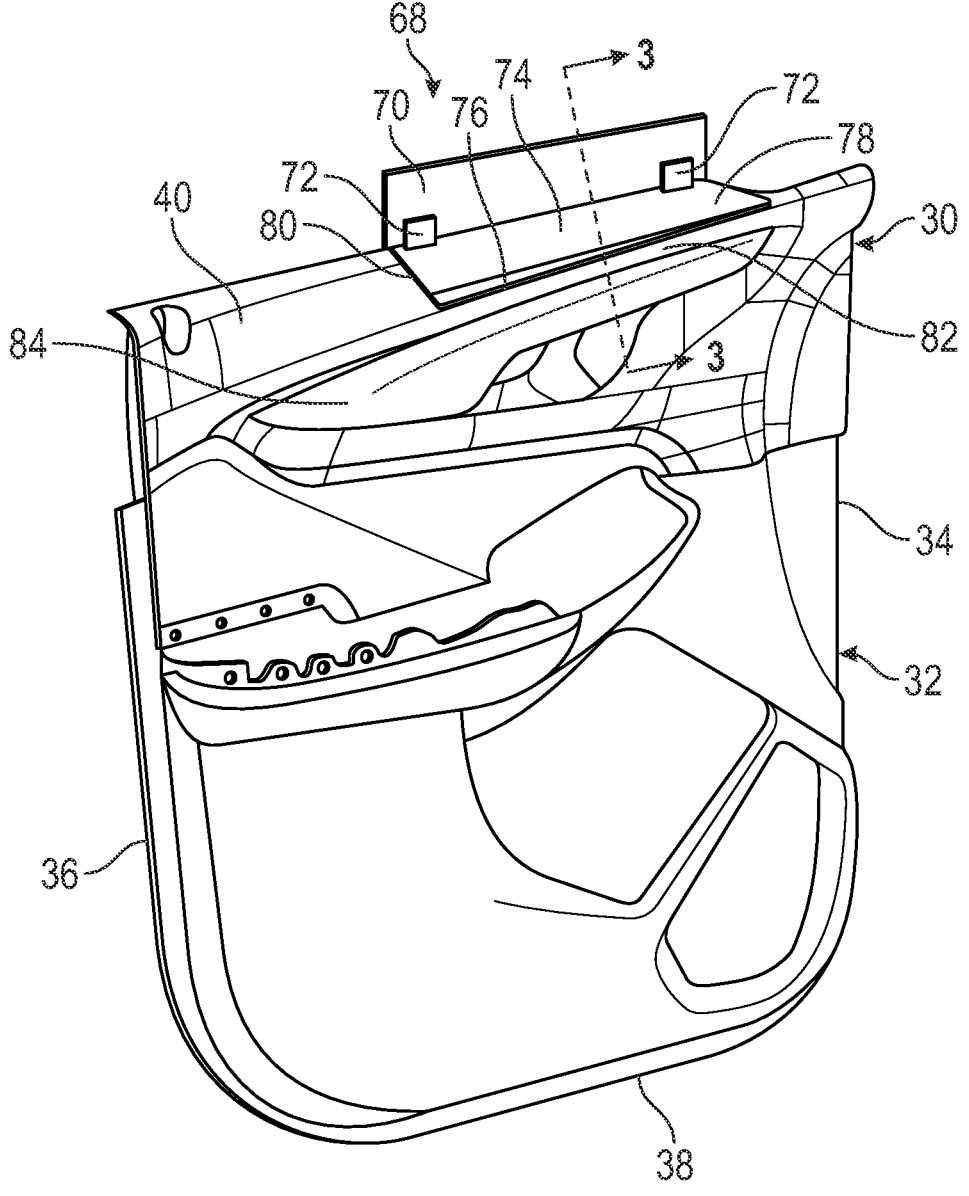
FIG. 2 is a perspective view of a lower portion of a vehicle door interior panel having a storage compartment along a top surface of the lower portion of the vehicle door interior panel according to a number of variations.
Figure 3:
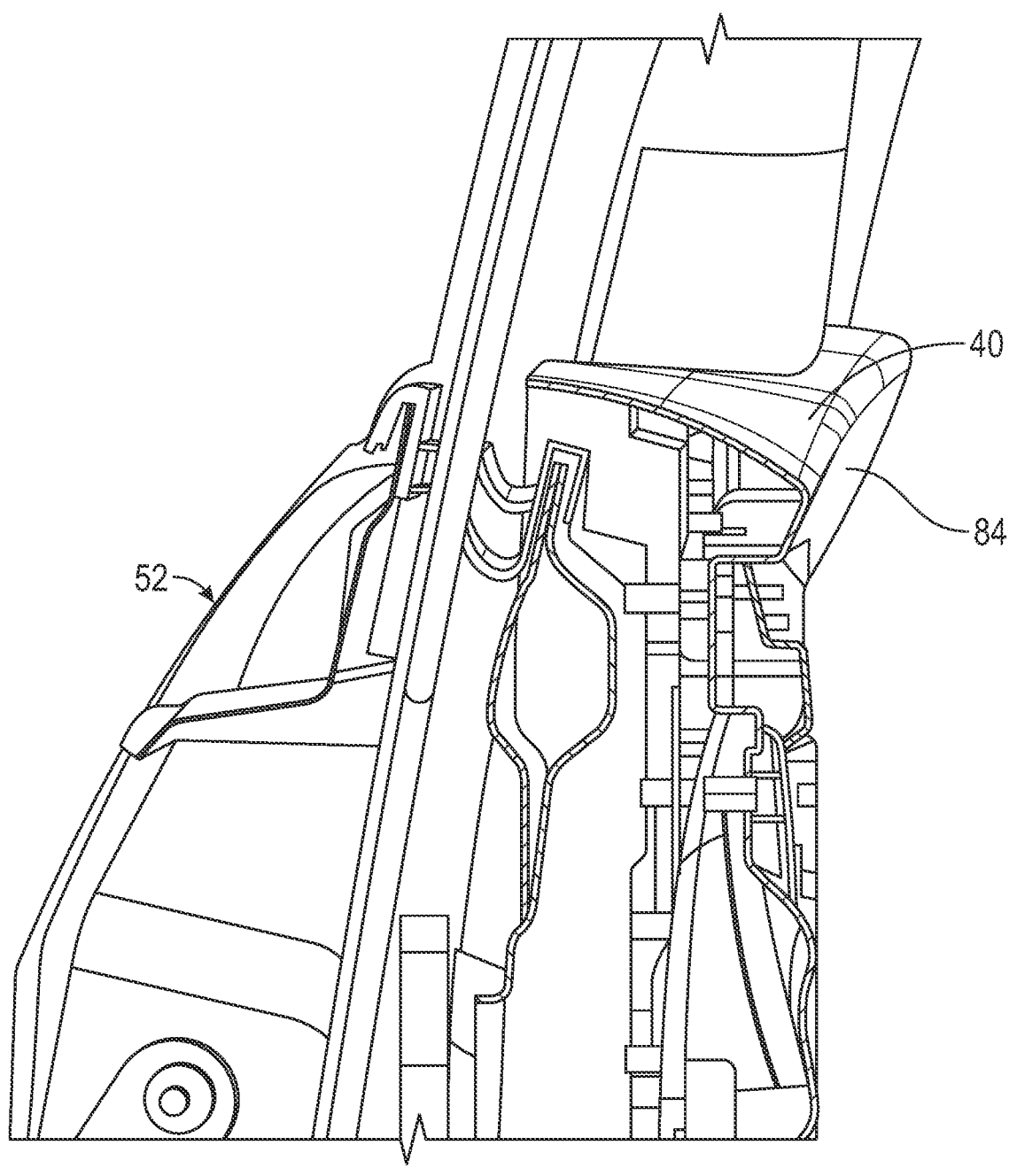
FIG. 3 is a sectional view taken along lines 3-3 of FIG. 2 according to a number of variations.

A number of variations are illustrated in FIGS. 2-3, which may include a lower portion 32 of the vehicle door interior panel 30 having a storage compartment 68 therein. The storage compartment 68 may include a lid 70, at least one hinge 72 connected to the lid 70, and outer wall 74 connected to a bottom wall 76, and a front wall 78 and rear wall 80 each connected to the bottom wall 76. The vehicle door interior panel 30 may include an interior face 84 joining the top surface 40. The lid 70 of the storage compartment 68 may form a portion of the top surface 40 of the lower portion 32 of the vehicle door interior panel 30.

Figure 4:
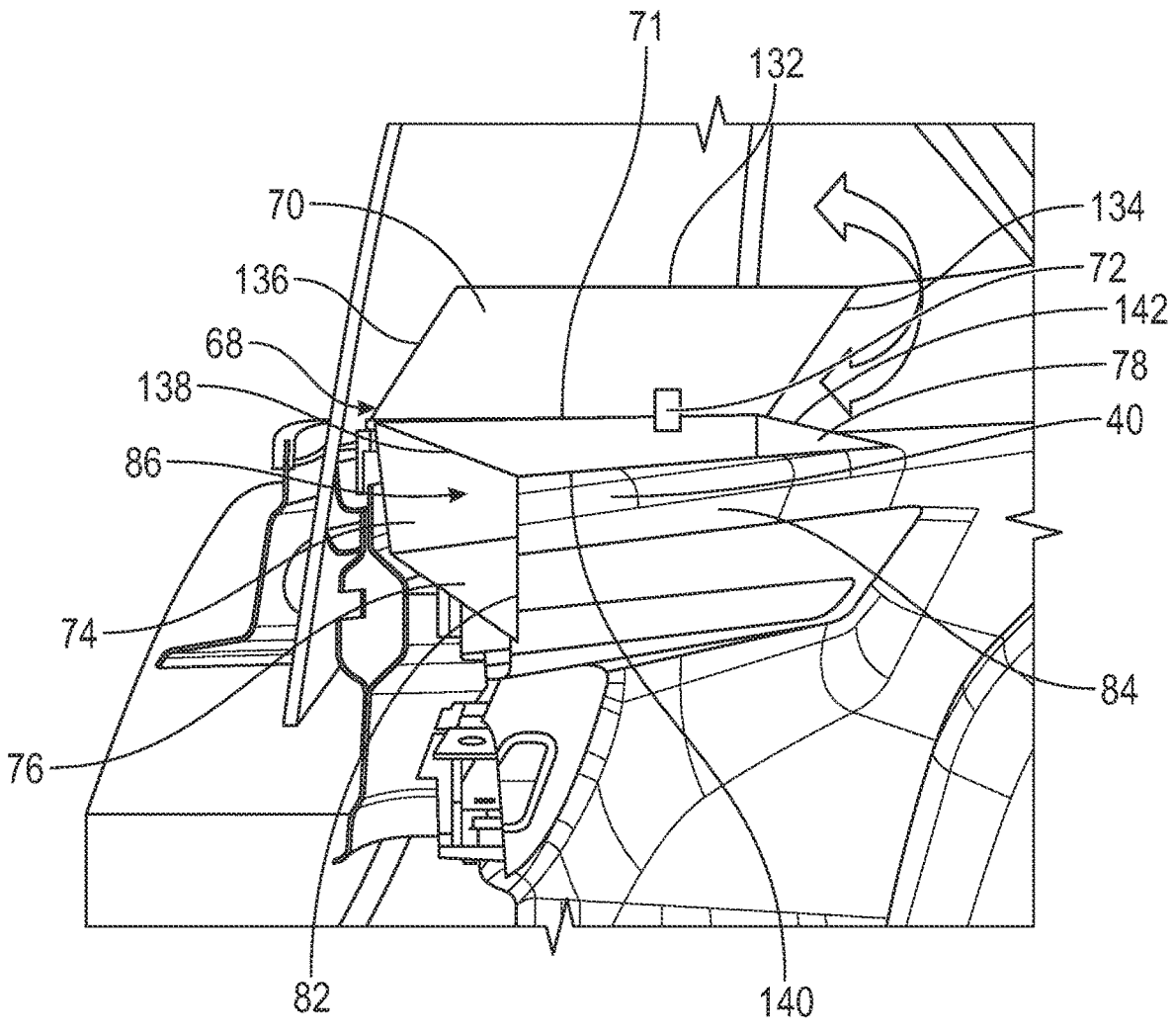
FIG. 4 is a perspective, partial view of the vehicle door interior panel having a storage compartment along the top surface of the lower portion of the vehicle door interior panel with a lid of the storage compartment and an open position according to a number of variations.

A number of variations are illustrated in FIG. 4 wherein the lid 70, outer wall 74, bottom wall 76, front wall 78, rear wall 80, and an inner wall 82 (not shown in FIG. 4) define a space for luggage and other objects. At least one hinge 72 may be operatively connected to the lid 70 and one of the outer wall 74, front wall 78, rear wall 80, an inner wall 82 so that the lid 70 may be swung to an open position or close position wherein the lid 70 engages at least one of the outer wall 74, front wall 78, rear wall 80, an inner wall 82. The lid 70 may include a lower edge 71, a first end edge 136 and an opposite second end edge 134 joining the lower edge 71 and a top edge 132. The outer wall 74 may have first upper edge 75, rear wall 80 may have second upper edge 138, the inner wall 82 may have third upper edge 140, and the front wall 78 may have fourth upper edge 142.

Figure 5:
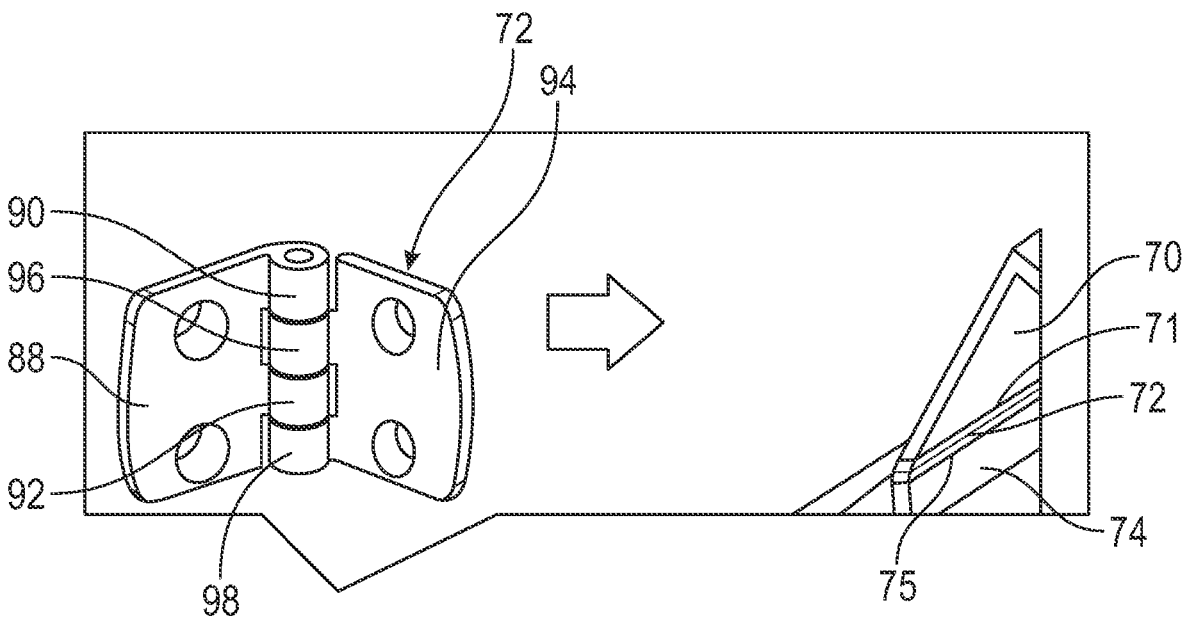
FIG. 5 illustrates to variations of a hinge for use with a lid of a storage compartment according to a number of variations.

A number of variations are illustrated in FIG. 5 which may include a hinge 72 made of a metal or a polymeric material including a first hinge piece 88 having a first finger 90 and spaced apart a second finger 92. The hinge 72 may include a second piece 94 having a third finger 96 and spaced apart a fourth finger 98. The first finger 90 and the second finger 92 may be interdigitated with the third finger 96 and the fourth finger 98. The hinge 72 may be made from a relatively flexible material which may be a metal, a polymeric material, or a fabric and may extend along at least a portion of a lower edge 71 of the lid 70 and long an upper edge 75, 142, 138, 140 of one of the outer wall 74, front wall 78, rear wall 80, an inner wall 82, respectively.

Figure 6:
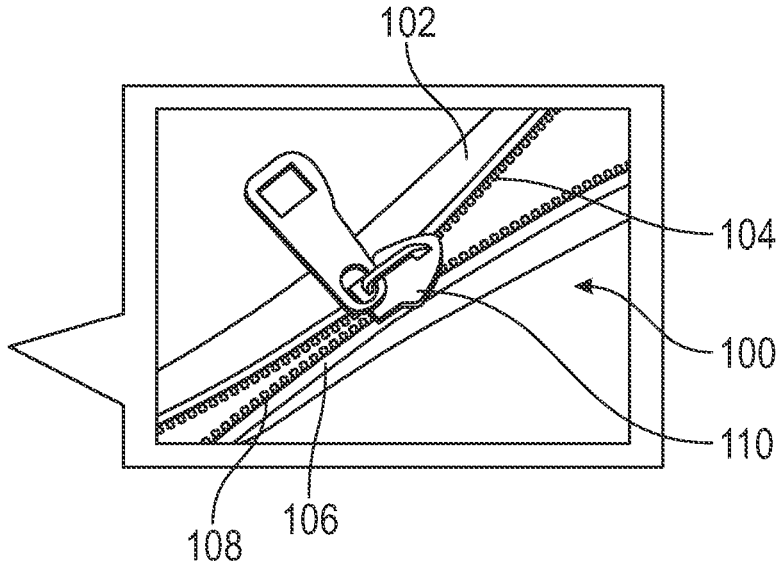
FIG. 6 illustrates a zipper for use in closing and/or locking the lid of a storage compartment according to a number of variations.

A number of variations are illustrated in FIG. 6 which may include a zipper 100 having first strip of fabric 102 having a first row of spaced a part teeth 104 attached thereto, and second strip of fabric 106 having a second row of spaced a part teeth 108 attached thereto, and a slide 110 for drawing the first row of spaced a part teeth 104 and the second row of spaced a part teeth 108 together to close the storage compartment 68 or to separate the first row of spaced a part teeth 104 and the second row of spaced a part teeth 108 to open the storage compartment 68 and allow the lid 70 to be moved to an open position. The first strip of fabric 102 and first row of spaced a part teeth 104 may be provided along at least one of the lower edge 71, the first end edge 136, the opposite second end edge 134 or a top edge 132 of the lid 70. In a number of variations, the first strip of fabric 102 and first row of spaced a part teeth 104 may be provided along three of the lower edge 71, the first end edge 136, the opposite second end edge 134 or a top edge 132 of the lid 70. The second strip of fabric 106 and second row of spaced a part teeth 108 may be provided along at least one of the first upper edge 75 of the outer wall 74, the second upper edge 138 rear wall 80, the third upper edge 140 the inner wall 82, or fourth upper edge 142 the front wall 78. In a number of variations, the second strip of fabric 106 and second row of spaced a part teeth 108 may be provided along three of the first upper edge 75 of the outer wall 74, the second upper edge 138 of rear wall 80, the third upper edge 140 the inner wall 82, or fourth upper edge 142 the front wall 78. In a number of variations, the storage compartment 68 and the lid 70 there of may have a variety of shapes.

Figure 7:
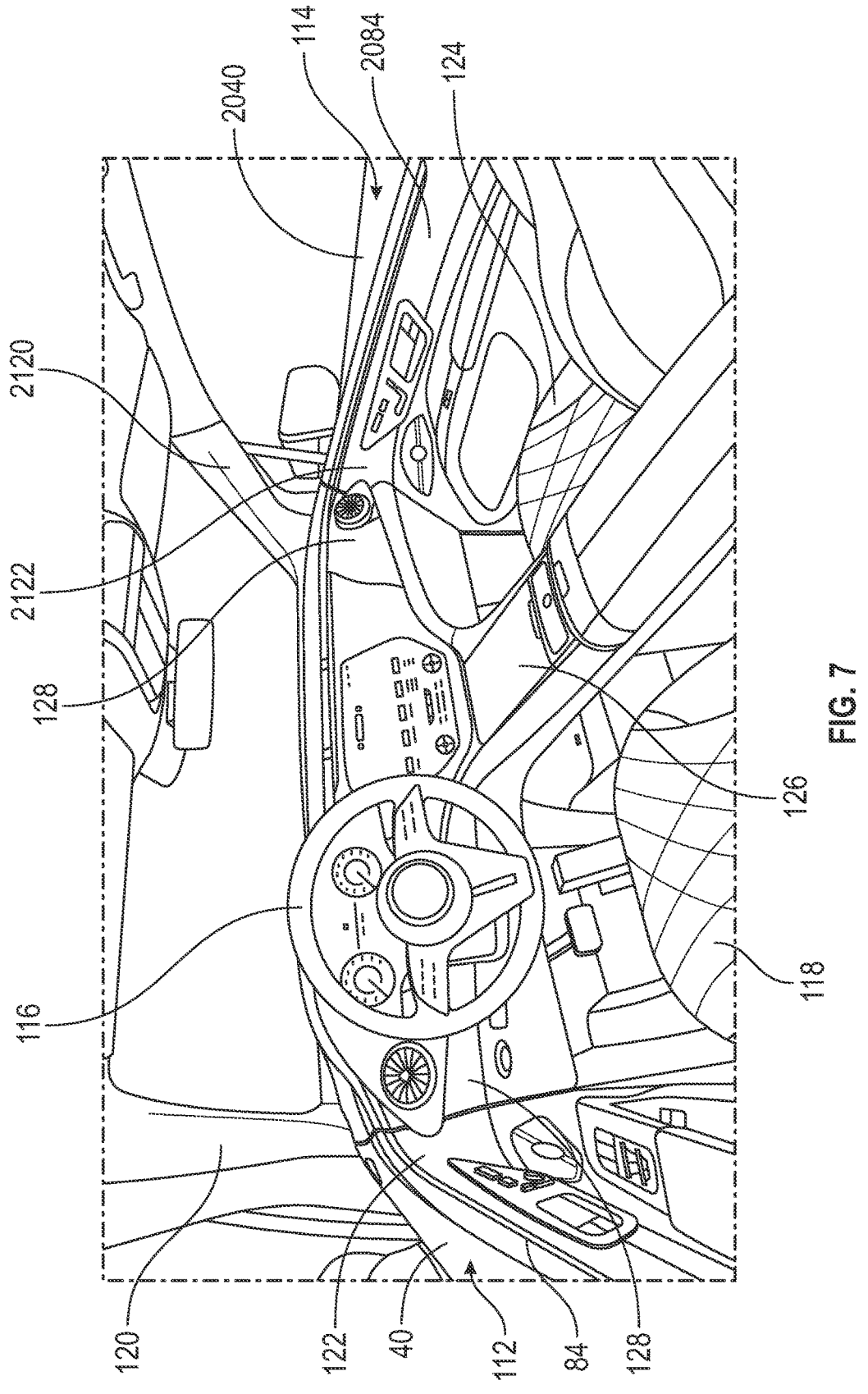
FIG. 7 is a partial view illustrating a vehicle interior having a vehicle door interior panel having a curve portion engaging a dashboard wherein the curved portion provides a space there behind is suitable receiving at least a portion of a storage compartment for according to a number of variations.

FIG. 7 is a partial view illustrating a vehicle interior wherein the vehicle may include a pair of spaced apart a-pillars 120, 2120 and a dashboard 128 extending therebetween. A driver side door interior panel 112 and a front passenger side door interior panel 114 may be provided. A steering 116 will may be connected to a shaft (not shown) extending through the dashboard 128. A driver seat 118 may be provided next to the driver side door interior panel 112 and a front passenger seat 124 may be provided next to the front passenger side door interior panel 114. The driver side door interior panel 112 may include a top surface 40 and an interior face 84 facing the driver seat 118. The interior face 84 may have a curved portion 122 providing a space there behind which may receive at least a portion of a storage compartment according to a number of variations. Similarly, the front passenger side door interior panel 114 may include a top surface 2040 and an interior face 2084 which may have a curved portion 2122 providing a space there behind for receiving at least a portion of a storage compartment according to a number of variations. A center counsel 126 may be provided between the driver seat 118 and the front passenger seat 124.

While at least one illustrative variation has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A product comprising:
a vehicle door interior panel having lower portion having a front surface, opposite rear surface, bottom surface and a top surface, a storage compartment having a lid hinged to at least one wall, wherein the lid forms a portion of the top surface of the lower portion of the vehicle door interior panel, the top surface of the lower portion defining a window opening, the at least one wall comprises an outer wall, a front wall, a rear wall, and an inner wall each extending from a bottom wall, wherein the outer wall and the inner wall are each fixed to the front wall and the rear wall, and wherein each of the outer wall, the front wall, the rear wall, the inner wall and the bottom wall are solid and do not have a through hole formed therein.

2. The product as set forth in claim 1 wherein the lid includes a lower edge, a first end edge and an opposite second end edge joining the lower edge and a top edge, wherein the lid is hinged to the front wall.

3. The product as set forth in claim 2 wherein the outer wall has a first upper edge, the rear wall having a second upper edge, the inner wall having a third upper edge, and the front wall having a fourth upper edge.

4. The product as set forth in claim 3 wherein the lid in a closed position engages at least one of the outer wall, the front wall, the rear wall, or the inner wall.

5. The product as set forth in claim 3 wherein the lid is hinged to one of the outer wall, the front wall, the rear wall, or the inner wall.

6. The product as set forth in claim 5 wherein the lid is hinged to one of the outer wall, the front wall, the rear wall, or the inner wall by a metal hinge or a flexible hinge comprising a polymeric material or fabric.

7. The product as set forth in claim 6 further comprising a zipper having a first row of teeth connected to the lid and a second row of teeth connected to the at least one wall, and a slide for drawing the first row of teeth and the second row of teeth together to close the storage compartment or to separate the first row of teeth and the second row of teeth to open the storage compartment and allow the lid to be moved to an open position.

8. The product as set forth in claim 3 wherein the lid, the bottom wall, and at least one of the outer wall, the front wall, the rear wall, or the inner wall comprises an inflexible material.

9. The product as set forth in claim 8 wherein the inflexible material comprises a polymeric material, composite, or metal.

10. The product as set forth in claim 1 further comprising a fabric, natural leather, synthetic leather, or polymeric material covering an outer surface of the lid.

11. The product as set forth in claim 1 wherein the storage compartment is located along the top surface closer to the front surface than the opposite rear surface of the vehicle door interior panel.

12. The product as set forth in claim 1 further comprising a vehicle having a dashboard and wherein the storage compartment is located along the top surface near the dashboard.

13. The product as set forth in claim 12 wherein interior panel includes an interior face facing a driver seat or passenger seat, and wherein the interior face includes a portion curved toward the dashboard, and wherein at least a portion of the storage compartment is located behind the portion curved toward the dashboard of the interior face of the interior panel.

14. The product is set forth in claim 1 further comprising a vehicle having an A-pillar and wherein the storage compartment is located along the top surface on the vehicle door interior panel near the A-pillar.

15. A product comprising:
a vehicle having a pair of spaced a part A-pillars and a dashboard extending therebetween;
a vehicle door interior panel having lower portion having a front surface, opposite rear surface, bottom surface and a top surface, a storage compartment having a lid hinged to at least one wall, wherein the lid forms a portion of the top surface of a bottom portion of the vehicle door interior panel;
wherein the storage compartment is located along the top surface of the vehicle door interior panel closest to the dashboard and one of spaced apart A-pillars, the at least one wall comprises an outer wall, a front wall, a rear wall, and an inner wall each extending from a bottom wall, wherein the outer wall and the inner wall are each fixed to the front wall and the rear wall, and wherein each of the outer wall, the front wall, the rear wall, the inner wall and the bottom wall are solid and do not have a through hole formed therein.

16. The product as set forth in claim 15 wherein the lid is hinged to the rear wall.

17. The product as set forth in claim 16 wherein the lid is hinged to one of the outer wall, the front wall, the rear wall, or the inner wall by a metal hinge or a flexible hinge comprising a polymeric material or fabric.

18. The product is set forth in claim 17 further comprising a zipper having a first row of teeth connected to the lid and a second row of teeth connected to the at least one wall, and a slide for drawing the first row of teeth and the second row of teeth together to close the storage compartment or to separate the first row of teeth and the second row of teeth to open the storage compartment and allow the lid to be moved to an open position.

19. A product as set forth in claim 18 wherein the vehicle door interior panel includes an interior face facing a driver seat or passenger seat, and wherein the interior face includes a portion curved toward the dashboard, and wherein at least a portion of the storage compartment is located behind the portion curved toward the dashboard of the interior face of the vehicle door interior panel.

20. A method comprising:

assembling a vehicle door interior panel having lower portion having a front surface, opposite rear surface, bottom surface and a top surface, a storage compartment having a lid hinged to at least one wall, wherein the lid forms a portion of the top surface of a bottom portion of the vehicle door interior panel, the at least one wall comprises an outer wall, a front wall, a rear wall, and an inner wall each extending from a bottom wall, the at least one wall comprises an outer wall, a front wall, a rear wall, and an inner wall each extending from a bottom wall, wherein the outer wall and the inner wall are each fixed to the front wall and the rear wall, and wherein each of the outer wall, the front wall, the rear wall, the inner wall and the bottom wall are solid and do not have a through hole formed therein.

* * * * *